United States Patent
Ivan et al.

(10) Patent No.: US 9,672,040 B2
(45) Date of Patent: Jun. 6, 2017

(54) APPARATUS AND METHOD FOR DETERMINING A CUMULATIVE SIZE OF TRACE MESSAGES GENERATED BY A PLURALITY OF INSTRUCTIONS

(71) Applicants: Radu-Marian Ivan, Bucharest (RO); Razvan Lucian Ionescu, Bucharest (RO); Florina Maria Terzea, Bucharest (RO)

(72) Inventors: Radu-Marian Ivan, Bucharest (RO); Razvan Lucian Ionescu, Bucharest (RO); Florina Maria Terzea, Bucharest (RO)

(73) Assignee: NXP USA, INC., Austin, TX (US)

( * ) Notice: Subject to any disclaimer, the term of this patent is extended or adjusted under 35 U.S.C. 154(b) by 274 days.

(21) Appl. No.: 14/564,673

(22) Filed: Dec. 9, 2014

(65) Prior Publication Data

US 2016/0103686 A1    Apr. 14, 2016

(30) Foreign Application Priority Data

Oct. 8, 2014   (RO) .................................. 2014 00752

(51) Int. Cl.

| G06F 9/30 | (2006.01) |
| --- | --- |
| G06F 9/44 | (2006.01) |
| G06F 11/36 | (2006.01) |
| G06F 11/34 | (2006.01) |
| G06F 17/40 | (2006.01) |

(52) U.S. Cl.
CPC ...... *G06F 9/30145* (2013.01); *G06F 11/3476* (2013.01); *G06F 11/36* (2013.01); *G06F 17/40* (2013.01)

(58) Field of Classification Search
CPC .. G06F 9/30145; G06F 17/40; G06F 11/3476; G06F 11/36
USPC ........................................... 712/227; 717/128
See application file for complete search history.

(56) References Cited

U.S. PATENT DOCUMENTS

| 6,912,673 | B1 | 6/2005 | Wyland | |
| 8,140,911 | B2 * | 3/2012 | Borghetti | G06F 11/3409 |
| | | | | 714/25 |
| 8,271,956 | B2 | 9/2012 | Howland et al. | |
| 2006/0184836 | A1 * | 8/2006 | Al-Omari | G06F 11/2268 |
| | | | | 714/45 |
| 2009/0031173 | A1 * | 1/2009 | Al-Omari | G06F 11/2268 |
| | | | | 714/45 |
| 2009/0204949 | A1 * | 8/2009 | Howland | G06F 11/3466 |
| | | | | 717/128 |
| 2009/0241096 | A1 * | 9/2009 | Borghetti | G06F 11/3409 |
| | | | | 717/128 |

(Continued)

*Primary Examiner* — John Chavis

(57) ABSTRACT

An apparatus comprising: at least one processor; and at least one memory including computer program code; the at least one memory and the computer program code configured to, with the at least one processor, cause the apparatus at least to perform static code analysis of a plurality of instructions comprising, for each instruction: determining whether a trace message is generated by the instruction; determining whether a size of the trace message generated by the instruction is dependent on a context; determining a size of the trace message generated by the instruction; and updating the context; and to perform determining a cumulative size of trace messages generated by the plurality of instructions.

20 Claims, 6 Drawing Sheets

(56) References Cited

U.S. PATENT DOCUMENTS

2013/0083654 A1    4/2013   Lee et al.
2015/0046751 A1*   2/2015   Bohling ............. G06F 11/3476
                                                                  714/37

* cited by examiner

APPARATUS AND METHOD FOR DETERMINING A CUMULATIVE SIZE OF TRACE MESSAGES GENERATED BY A PLURALITY OF INSTRUCTIONS

CROSS REFERENCE TO RELATED APPLICATION(S)

The present application claims priority to Romanian Patent Application No. RO A 2014 00752, entitled "AN APPARATUS AND METHOD FOR DETERMINING A CUMULATIVE SIZE OF TRACE MESSAGES GENERATED BY A PLURALITY OF INSTRUCTIONS," filed on Oct. 8, 2014, the entirety of which is herein incorporated by reference.

FIELD OF THE INVENTION

This invention relates to the field of digital processing systems. More particularly, this invention relates to trace data streams of a digital processing system and supporting users of such systems.

BACKGROUND OF THE INVENTION

Trace messages are messages that are produced during execution of a computer program by a digital processing system. The purpose of the trace messages is to trace the execution process. The trace messages are generated during execution of the computer program and stored as a log for subsequent review. The log of trace messages may, for example, indicate which instructions were being executed, and/or which data values were manipulated and/or which data values were read or written to particular memory locations.

The trace messages produced by an executing computer program will depend upon the computer program and the particular protocol used to generate trace messages. The protocol defines when a trace message is generated and the format of the trace message.

It may be necessary to define, in advance of executing a computer program, how much memory should be reserved for storing trace messages as a log. For this reason, and other reasons, it may be useful to know in advance of executing a computer program how much memory the generated trace messages will need when logged.

SUMMARY OF THE INVENTION

The present invention provides an apparatus, a method or a computer program as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
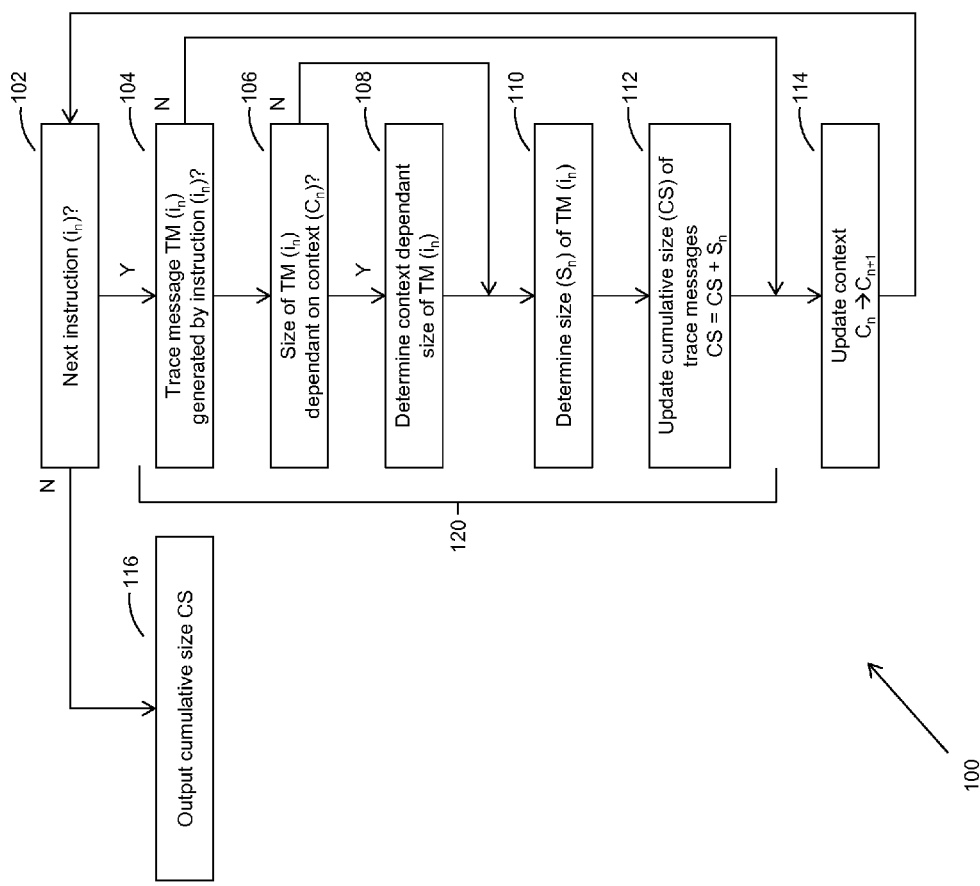
FIG. 1 schematically shows an example of a method of estimating a size of memory required to store trace messages generated by instructions.

Because the illustrated embodiments of the present invention may, for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

Trace messages are messages that are produced during execution of a computer program by a digital processing system. The purpose of the trace messages is to trace the execution process. The trace messages are generated during execution of the computer program and stored as a log for subsequent review.

The trace messages produced by an executing computer program will depend upon the computer program and the particular protocol used to generate trace messages. The protocol defines when a trace message is generated and the format of the trace message.

It may be necessary to define, in advance of executing a computer program, how much memory should be reserved for storing trace messages as a log. For this reason, and other reasons, it may be useful to know in advance of executing a computer program how much memory the generated trace messages will need when logged.

In embedded digital processing systems, particularly those where memory resources are shared, it is important to reserve enough but not too much memory for the trace messages log.

This patent application presents an apparatus, method or computer program for estimating, using static code analysis, how much memory is required for a trace message log.

During the execution of a computer program various parameters change, the collection of these parameters defines a "context". During static code analysis of a computer program the same or similar parameters change, and the collection of these parameters may also be described as a "context". In the following description, "context" is defined by a collection of parameters that are dynamically updated during static code analysis. Examples of such parameters may, for example include, but are not limited to: the number of instructions analysed, the last instruction analysed, time elapsed, addresses, address changes, or other parameters used to manage the static code analysis of the computer program. When one or more of the context defining parameters is updated (changed) then the context is also updated (changed).

During static code analysis, it can be considered whether each instruction will produce a trace message according to a trace message protocol and if it does, what size that trace message will be. A trace message has a format that is dependent upon the trace message protocol. Some trace messages or portions of trace messages may be static and do not change size. These are fixed-size messages or fixed-size portions. Other trace messages or portions of trace messages may be dynamic and may change size depending upon the current context. These are dynamic-size messages or dynamic-size portions. The current context changes after the static code analysis of each instruction.

FIG. 1 schematically shows an example of a method 100 of estimating a size of memory required to store trace messages generated by instructions $\{i_n\}$, comprising: performing static code analysis 120 of the instructions $\{i_n\}$ comprising, for each instruction $i_n$, determining 104 whether a trace message is generated by the instruction $i_n$; determining 106 whether a size of the trace message generated by the instructions $i_n$ is context dependent; determining 110 a size of the trace message generated by the instruction $i_n$; updating context 114; and determining 112 a cumulative size of the trace messages generated by the instructions $\{i_n\}$.

In more detail, the method 100 starts at block 102 where the next instruction $i_n$ is taken for static code analysis 120 from the set of multiple instructions $\{i_n\}$ in a computer program. The method then performs static code analysis 120 on this instruction $i_n$ (the current instruction). This static code analysis of the current instruction is performed using a current context $C_n$. The static code analysis 120 uses the current context $C_n$ to determine the size of any trace message that would be generated as a consequence of executing the current instruction.

The static code analysis 120 starts at block 104. At block 104 it is determined whether or not a trace message is generated by the current instruction. If a trace message is generated by the current instruction then the method moves to block 106. If a trace message is not generated by the current instruction then the method moves to after the static analysis 120, to block 114 in this example.

At block 106 it is determined whether a size of the trace message generated by the current instruction is context dependent. If a size of the trace message generated by the current instruction is context dependent then the trace message comprises dynamic-size portions and the method moves to block 108. If a size of the trace message generated by the current instruction is not context dependent then the trace message comprises only fixed-size portions and the method moves to block 110. It some examples, it may be possible for a trace message to be context dependent but its size to be context independent. The term 'dynamic-size' is used to refer to trace messages or portions of trace messages that are context dependent and have a size that is context dependent.

At block 108, the size of the dynamic-size portions of the trace message generated by the current instruction are determined. The method then moves to block 110.

At block 110, if the trace message generated by the current instruction has fixed-size portions that are not context dependent then the size of the fixed-size portions are determined. The size of the dynamic-size context dependent portions of the trace message generated by the current instruction (if any) and the size of the fixed-size static portions of the trace message generated by the current instruction (if any) are summed to determine a size for the trace message generated by the current instruction.

At block 112, a cumulative size of the trace messages generated by the instructions analysed prior to the current instruction $i_n$ and the size of the trace messages generated by the analysis of the current instruction $i_n$ are summed to produce a cumulative size of the trace messages generated by the instructions analysed up to and including the current instruction.

The static code analysis 120 then ends.

The current context is then updated at block 114, although this may alternatively occur before the static code analysis 120.

The method 100 then loops to return to block 102, where the next instruction $i_{n+1}$ is taken for static code analysis 120 from the set of multiple instructions $\{i_n\}$ in the computer program and the above described method repeats.

Once the last instruction of the set of multiple instructions $\{i_n\}$ has been analysed, the block 102 cannot take a next instruction for static code analysis 120 and the method moves to block 116, where the cumulative size of the trace messages generated by the set of multiple instructions $\{i_n\}$ is output, for example, to a user interface or to a memory for storage.

Figure 3:
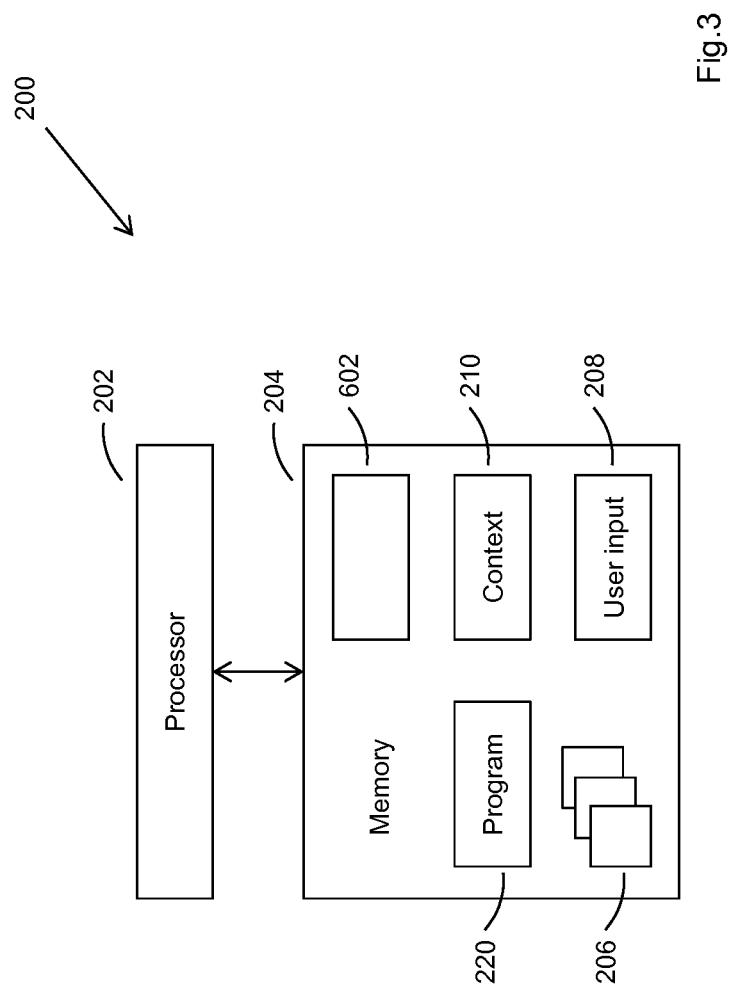
FIG. 3 schematically shows an example of an apparatus that is suitable for performing the method of FIG. 1.

FIG. 3 schematically shows an example of an apparatus 200 that is suitable for performing the method 100.

Implementation of the apparatus 200 may be in hardware alone, have certain aspects in software including firmware alone or can be a combination of hardware and software (including firmware).

In the example illustrated in FIG. 3, a processor 202 is configured to read from and write to the memory 204. The processor 202 may also comprise an output interface via which data and/or commands are output by the processor 202 and an input interface via which data and/or commands are input to the processor 202.

The memory 204 stores a computer program 602 comprising computer program instructions (computer program code) that controls the operation of the apparatus 200 when loaded into the processor 202. The computer program instructions, of the computer program 602, provide the logic and routines that enables the apparatus to perform the methods illustrated in FIGS. 1 and/or 2. The processor 202 by reading the memory 204 is able to load and execute the computer program 602.

In this example but not necessarily all examples the apparatus 200 comprises: at least one processor 202; and at least one memory 204 including computer program code 602 the at least one memory 204 and the computer program code 220 configured to, with the at least one processor 202, cause the apparatus 200 at least: (i) to perform static code analysis 120 of a plurality of instructions $\{i_n\}$ comprising, for each instruction $i_n$: determining whether a trace message is generated by the current instruction $i_n$; determining whether a size of the trace message generated by the current instruction $i_n$ is dependent on a current context $C_n$; determining a size of the trace message generated by the current instruction $i_n$; and updating the current context $C_n$. and (ii) to perform determining a cumulative size of trace messages generated by the plurality of instructions $\{i_n\}$.

Figure 9:
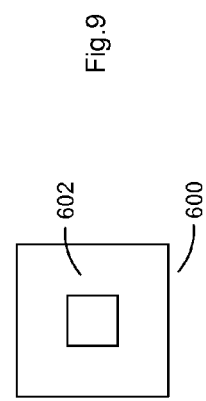
FIG. 9 schematically shows an example of a record medium that embodies a computer program.

The computer program 602 may arrive at the apparatus 200 via any suitable delivery mechanism 600, as illustrated in FIG. 9. The delivery mechanism 600 may be, for example, a non-transitory computer-readable storage medium, a computer program product, a memory device, a record medium such as a compact disc read-only memory (CD-ROM) or digital versatile disc (DVD), or an article of manufacture that tangibly embodies the computer program 602. The delivery mechanism may be a signal configured to reliably transfer the computer program 602. The apparatus 200 may propagate or transmit the computer program 602 as a computer data signal.

Although the memory 204 is illustrated as a single component/circuitry it may be implemented as one or more separate components/circuitry some or all of which may be integrated/removable and/or may provide permanent/semi-permanent/dynamic/cached storage.

Although the processor 202 is illustrated as a single component/circuitry it may be implemented as one or more separate components/circuitry some or all of which may be integrated/removable. The processor 202 may be a single core or multi-core processor.

References to 'computer-readable storage medium', 'computer program product', 'tangibly embodied computer program' etc. or 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 2:
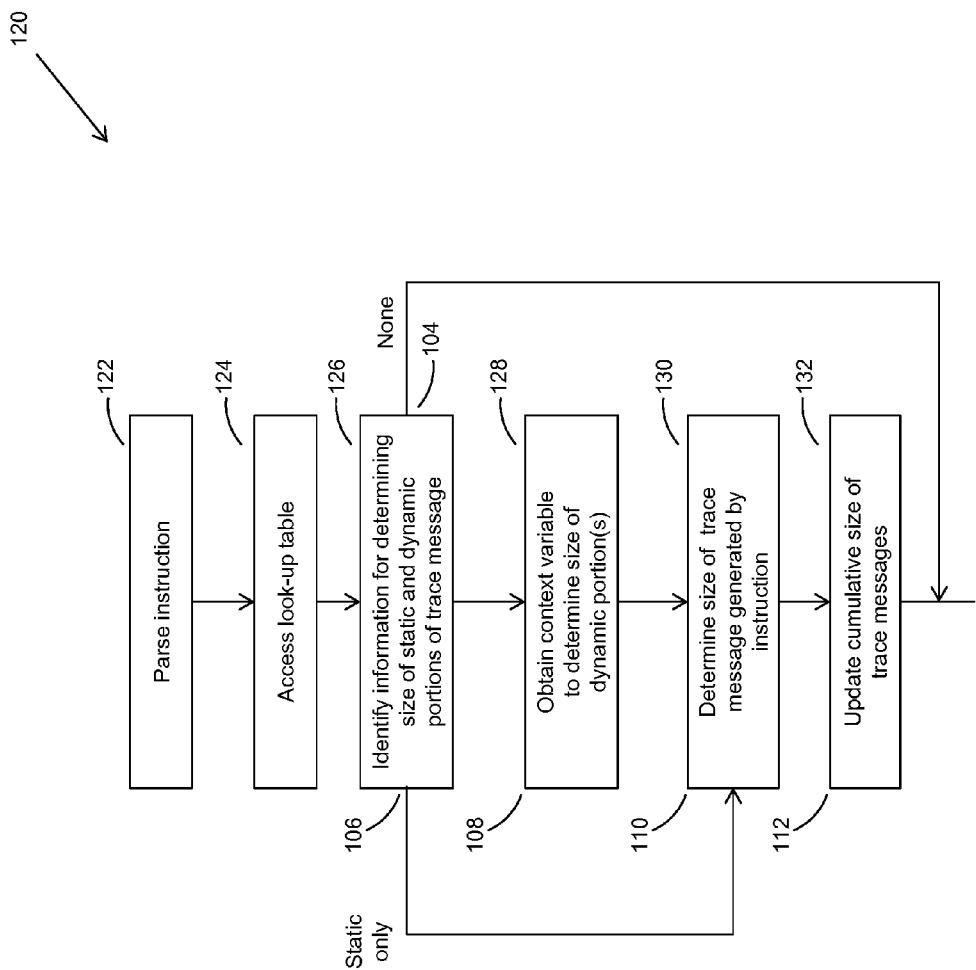
FIG. 2 schematically shows an example of static code analysis using a look-up table.

The blocks illustrated in the FIGS. 1 and 2 may represent steps in a method and/or sections of code in the computer program 602. The illustration of a particular order to the blocks does not necessarily imply that there is a required or preferred order for the blocks and the order and arrangement of the block may be varied. Furthermore, it may be possible for some blocks to be omitted.

FIG. 2 schematically shows an example of static code analysis 120, for example as used in the method 100 illustrated in FIG. 1. This example of static code analysis 120 uses a look-up table. The following text describes not only the method illustrated in FIG. 2 but also how the blocks in FIG. 2 correspond to the blocks of FIG. 1.

The static code analysis 120 starts at block 122 where the current instruction is parsed to extract an portion of the instruction for use as a look-up index for addressing the look-up table 206.

For example, if the instructions $\{i_n\}$ are assembly code instructions then operations codes may be used as representations of machine code. A current instruction may be parsed to extract the operations code as a look-up index.

Figure 4:
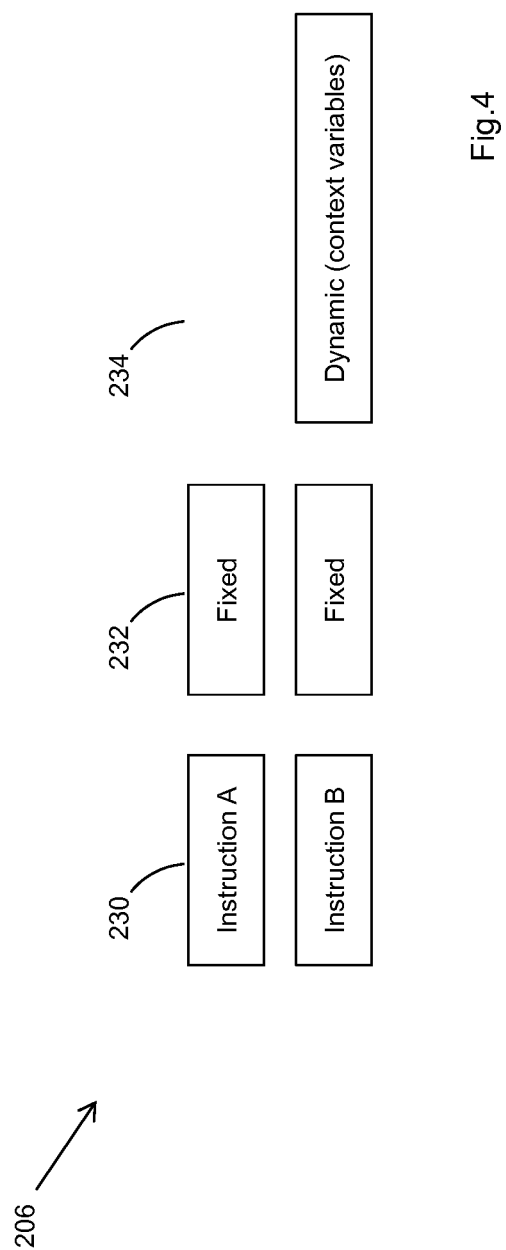
FIG. 4 schematically shows an example of a look-up table.

Next at block 124 the look-up table is accessed using the look-up index. An example of a look-up table 206 is shown in FIG. 4.

A look-up table 206 identifies information 232 for determining sizes of fixed-size portions of trace messages and information 234 for determining dynamic-size portions of trace messages.

The look-up table 206 associates an instruction index 230 with information 232, 234. This association is illustrated as a row in the look-up table 206 illustrated in FIG. 4.

Referring to block 126, if the look-up index matches an instruction index 230, the look-up table returns the information 232, 234 associated with that instruction index 230 in the look-up table 206 (if any). If the look-up index does not matches an instruction index 230, the look-up table may return a null value.

The look-up table 206 may, for example, provide information 234 that identifies whether a trace message produced in response to a particular instruction $i_n$ comprises fixed-size portions and/or dynamic-size portions and for dynamic-size portions 234, the look-up table 206 may identify at least one or more context parameters.

In some but not necessarily all examples, the look-up table 206 may return static information 232 that identifies a size of a fixed-size portion of a trace message produced in response to static code analysis 120 of a current instruction $i_n$. This static information 232 (if present) is associated, in the look-up table 206, with the instructions index 230 corresponding to the a current instruction $i_n$.

In some but not necessarily all examples, the look-up table 206 may return dynamic information 234 that identifies how a size of a dynamic-size portion of a trace message produced in response to static code analysis 120 of a current instruction $i_n$ varies with one or more identified context parameters. This dynamic information 234 (if present) is associated, in the look-up table 206, with the instructions index 230 corresponding to the current instruction $i_n$.

In this way, at block 126 it is determined whether or not a trace message is generated by the current instruction. If a trace message is not generated by the current instruction then the method moves to after the static code analysis 120. This is an example corresponding to block 104 in FIG. 1.

If a trace message is generated by the current instruction then it is determined from the look-up table access whether a size of the trace message generated by the current instruction is context dependent. If a size of the trace message generated by the current instruction is not context dependent the method moves to block 130. This is an example corresponding to block 106 in FIG. 1.

If a size of the trace message generated by the current instruction is context dependent then the method moves to block 128. At block 128, the current context parameters are accessed and the size of the dynamic-size portions of the trace message is determined using the returned dynamic information 234 from the look-up table. This is an example corresponding to block 108 in FIG. 1.

Next at block 130, if the trace message generated by the current instruction has fixed-size portions that are not context dependent then the size of the fixed-size portions are determined. The size of the dynamic-size portions of the trace message generated by the current instruction (if any) and the size of the fixed-size portions of the trace message generated by the current instruction (if any) are summed to determine a size for the trace message generated by the current instruction. This is an example corresponding to block 110 in FIG. 1.

Next at block 132, a cumulative size of the trace messages generated by the instructions analysed prior to the current instruction and the size of the trace messages generated by the analysis of the current instruction are summed to produce a cumulative size of the trace messages generated by the instructions analysed up to and including the current instruction. This is an example corresponding to block 112 in FIG. 1.

Then the static code analysis 120 ends.

Referring to FIG. 3, the apparatus 200 may be configured to perform the static code analysis illustrated in FIG. 2.

The memory 204 may store or may be configured to store one or more look-up tables 206. Each look-up table 206 may be used, for example, as previously described with reference to FIG. 2 and FIG. 4.

A look-up table 206 identifies information 232 for determining sizes of fixed-size portions of trace messages and information 234 for determining dynamic-size portions of trace messages. The look-up table 206 is accessed by the processor 202 which uses the look-up table 206 to determine: whether a trace message is generated by the instruction; whether a size of the trace message generated by the instruction is dynamic and dependent on the context; and how to determine a size of the trace message generated by the instruction. The look-up table associates an instruction index 230 with information 232, 234.

A different look-up table may be associated with different types of trace message. Whether or not an instruction produces a trace message and the format of the produced trace message is defined by the trace message protocol. Different trace message protocols may produce differently sized trace messages in response to different ones of the same set of instructions. It is therefore appropriate to use different look-up tables when the criteria for generating trace messages changes and/or the format/size of trace messages generated changes. It is therefore appropriate to have a different look-up table for different trace message protocols and, potentially, for different versions of the same protocol and for different options within a particular protocol and for other instances where different types of trace messages are generated. Reference to a difference in 'type' of trace message is intended to cover a change in format/size of trace message and/or a change in the criteria for generating trace messages.

One of the multiple look-up tables 206 is selected for consistent use during the static code analysis 120. Each of the multiple look-up tables, after selection, may be configured and used as previously described. Each of the multiple look-up tables 206 is for a different type of trace message. Each look-up table 206 identifies information 232, 234 for determining sizes of fixed-size and dynamic-size portions of trace messages and is used to determine whether a trace message is generated by the instruction; whether a size of the trace message generated by the instruction is dynamic and dependent on the context; and how to determine a size of the trace message generated by the instruction using particular context parameters.

In other examples, different look-up tables 206 may be associated with different formats of trace message.

In other examples, different look-up tables may be associated with different criteria for generating trace messages.

Referring back to FIG. 1, at block 102 selection of a next instruction occurs. A next instruction may typically be the following instructions in a list of instructions. However, in other examples the next instructions may be a different instruction.

This may for example occur where the last instruction is within a iterative loop and the condition for exiting the iterative loop has not yet been satisfied. In this example, the next instruction may be the same instruction or a preceding instruction within the loop.

This may for example occur where there is flow control such as a function call, branch etc. In this example, the next instruction may be specified explicitly or implicitly by a preceding instruction.

Figure 6:
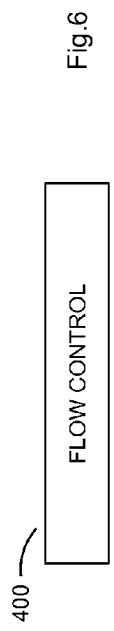
FIG. 6 schematically shows an example of a flow control block that may be performed by the method of FIG. 1.

FIG. 6 schematically shows an example of a flow control block 400 that may be performed by the method 100, for example within block 102. The flow control block 400 comprises, for the current instruction: determining whether a flow control is performed by the instruction and selecting what flow control is performed by the instruction to determine a next instruction used by the static code analysis 120. The flow control may be selected based on user input or the flow control may be selected automatically and, in this case, the selection made may be recorded.

Figure 7:
FIG. 7 schematically shows an example of iterative loop control block that may be performed by the method of FIG. 1.

FIG. 7 schematically shows an example of iterative loop control block 402 that may be performed by the method 100, for example within block 102. The iterative loop block 402 comprises, for the current instruction: determining whether an iterative loop is initiated by the current instruction and selecting the number of iterations of the iterative loop to determine next instructions used by the static code analysis 120. The number of iterations may be selected based on user input. The user may define a number of iterations to be used as a single standard value common to all iterative loops or may define distinct values specific to each iterative loop. Alternatively, the number of iterations may be selected automatically and, in this case, the selection may be recorded.

Figure 8:
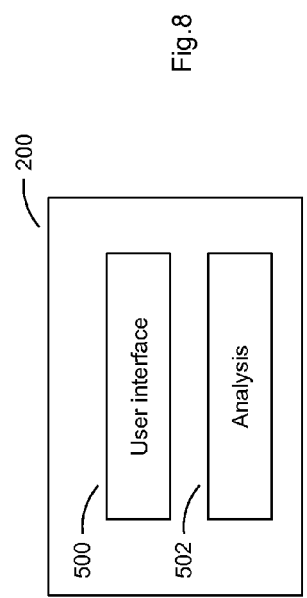
FIG. 8 schematically shows an example of an apparatus comprising a user interface module and an analysis module.

Referring to FIG. 8, the apparatus 200 may comprises a user interface module 500 and an analysis module 502.

Figure 5:
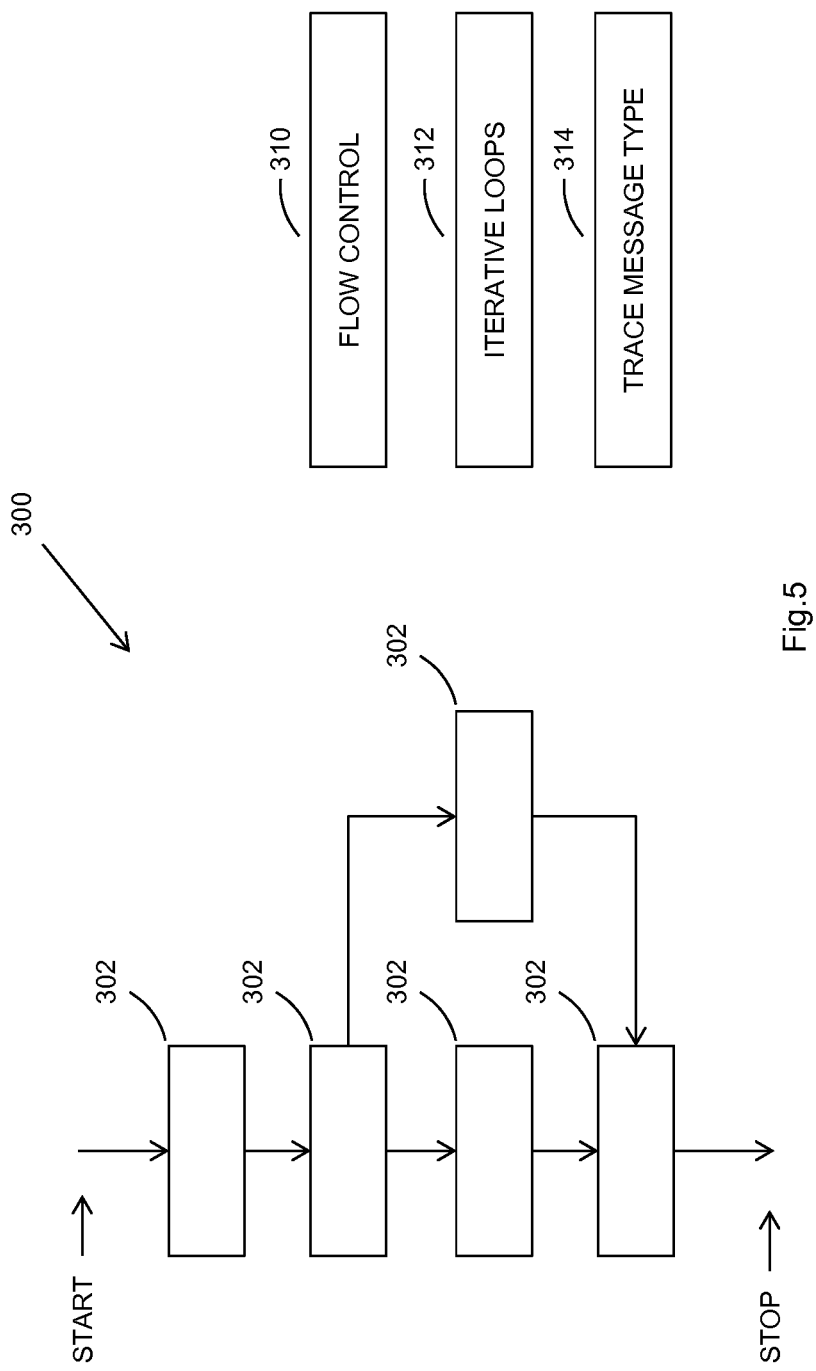
FIG. 5 schematically shows an example of a user interface of an apparatus.

The user interface module 502 is configured to provide a graphical user interface 300, for example as illustrated in FIG. 5, that represents a plurality of instructions as code blocks 302 and enables user control of one or more of: where a static code analysis starts (START); where the static code analysis ends (STOP); what flow control occurs (FLOW CONTROL 310); how many iterations occurs in an iterative loop (ITERATIVE LOOPS 312); and trace message type (TRACE MESSAGE TYPE 314).

The user interface 300 is configured to enable a user to select where static code analysis 120 starts (START) and where static code analysis 120 ends (STOP). The user interface 300 is configured to enable the user to move the position of the start (START) and, independently, the position of the end (STOP). The positions of START and STOP determines the set of instructions $\{i_n\}$ that will be analysed during static code analysis 120 to determine the size of memory required to store generated trace messages.

The code blocks 302 are represented as nodes of an interconnected graph. Where the graph branches or otherwise potentially effects flow control, a flow control input console 310 is presented in the user interface 300. The flow control input console 310 enables a consequence of the flow control to be specified by a user. This determines the sequence of instructions analysed.

Where a block 302 effects an iterative loop, an iterative loop flow control input console 312 may be presented in the user interface 300. In one example, a single iterative loop flow control input console 312 may be presented which is used by the user to define a number of iterations to be used as a single standard value common to all iterative loops. In another example, an iterative loop flow control input console 312 may be presented in association with each iterative loop. It may be used by the user to define a number of iterations to be used as a distinct value specific to the associated iterative loop.

The user interface 300 may present a trace message type console 314 configured to enable a user to select a particular trace message type. The user may for example be able to select different trace message protocols, different versions of trace message protocols, different criteria for generating trace message, different format for trace messages etc The analysis module 502 is configured to determine a cumulative size of the trace messages generated by the set of instructions {i$_n$} of the program 220, stored in memory 204. The set of instructions is specified by the user input parameters e.g. START, STOP.

The analysis module may be configured: to perform static code analysis 120 of a plurality of instructions {i$_n$} comprising, for each instruction: determining a size of a trace message generated by a current instruction based on a current context; and updating the context; and determining a cumulative size of trace messages generated by the plurality of instructions.

The analysis module 502 may be configured to perform the method 100 as illustrated in FIG. 1 and/or the method 120 illustrated in FIG. 2.

Referring to FIG. 3, the user interface module 500 may be enabled by the processor 202 executing a program stored in the memory 204. The parameters input via the user interface 300 may be stored as user input parameters 208 in the memory 204. The analysis module 502 may be enabled by the processor 202 executing the same program stored in the memory 204. The analysis module 502 may maintain a current context as a data structure stored in the memory 204 comprising a set of dynamic parameters 208.

The computer program which when loaded into the processor 202 enables the processor to perform the method 100 as illustrated in FIG. 1 and/or the method 120 illustrated in FIG. 2 and/or provide the user interface module 500 and the analysis module 502 illustrated in FIG. 8, may be stored in the memory 204. It may be transferred to or from the memory 204 via record medium 600 that embodies the computer program 602, for example as illustrated in FIG. 9.

In the foregoing description, determining a cumulative size of the trace messages generated by a set of instructions {i$_n$} has been described. However, the methods described may additionally or alternatively be used to determine other information such as, for example: the cumulative number of each different trace messages generated; the distribution over time of the generation of all trace messages; the distribution over time of the generation of different trace messages; or other statistical information.

In the foregoing description, there has been a description of determining a cumulative size of the trace messages generated by a set of instructions {i$_n$} following, for example, the most likely flow path through the instructions.

However, the methods described may additionally or alternatively be used to determine a cumulative size of the trace messages generated by a set of instructions {i$_n$} for each possible flow path. This may allow determination of the sensitivity of the determined cumulative size of the trace messages generated by a set of instructions {i$_n$} following a most likely flow path, to changes in the flow path.

In the foregoing description, there has been a description of determining a cumulative size of the trace messages generated by a set of instructions {i$_n$} by specifying the number of iterations performed with an iterative loop. However, the methods described may additionally or alternatively be used to determine a cumulative size of the trace messages generated by a set of instructions {i$_n$} for each of a different number of iterations, for one or more iterative loops. This may allow determination of the sensitivity of the determined cumulative size of the trace messages generated by a set of instructions {i$_n$}, to assumptions concerning iterative loops.

Thus the methods described may additionally or alternatively be used to determine the variability of the determined size of the required trace message log to user inputs.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may be provided on a, e.g. tangible non-transitory, computer readable storage medium comprising data loadable in a programmable apparatus, such as a CD-rom, diskette or other tangible and non-transitory data carrier, stored with data loadable in a memory of a computer system, the data representing the computer program. The computer readable storage medium may further be a data connection, such as a telephone cable or a wireless connection. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

In the foregoing specification, the invention has been described with reference to specific examples of embodiments of the invention. It will, however, be evident that various modifications and changes may be made therein without departing from the broader spirit and scope of the invention as set forth in the appended claims and that the examples are merely illustrative.

The connections may be a type of connection suitable to transfer signals from or to the respective nodes, units or devices, for example via intermediate devices. Accordingly, unless implied or stated otherwise the connections may for example be direct connections or indirect connections.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIGS. 3 and 8 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of apparatus 200 are circuitry located on a single integrated circuit or within a same device. Alternatively, apparatus 200 may include any number of separate integrated circuits or separate devices interconnected with each other.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in programmable hardware but can also be applied in non-programmable devices or units able to perform the desired device functions by operating in accordance with suitable embedded program code. Furthermore, the devices may be physically distributed over a number of apparatuses, while functionally operating as a single device.

Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. An apparatus comprising:
at least one processor; and
at least one memory including computer program code; the at least one memory and the computer program code configured to, with the at least one processor, cause the apparatus at least to perform static code analysis of a plurality of instructions comprising, for each instruction:
determining whether a trace message is generated by the instruction;
determining whether a size of the trace message generated by the instruction is dependent on a context;
determining a size of the trace message generated by the instruction; and
updating the context; and
to perform determining a cumulative size of trace messages generated by the plurality of instructions.

2. An apparatus as claimed in claim 1, wherein the memory stores or is configured to store a look-up table wherein the look-up table identifies information for determining sizes of static and dynamic portions of trace messages and is used to determine: whether a trace message is generated by the instruction; whether a size of the trace message generated by the instruction is dynamic and dependent on the context; and how to determine a size of the trace message generated by the instruction.

3. An apparatus as claimed in claim 2, wherein the look-up table identifies whether a trace message comprises fixed-size portions and/or dynamic-size portions and, for dynamic-size portions, identifies at least one or more context parameters.

4. An apparatus as claimed in claim 1, wherein the memory stores or is configured to store multiple look-up tables, wherein each of the multiple look-up tables is for a different type of trace message and wherein each look-up table identifies information for determining sizes of static and dynamic portions of trace messages and is used to determine whether a trace message is generated by the instruction; whether a size of the trace message generated by the instruction is dynamic and dependent on the context; and how to determine a size of the trace message generated by the instruction.

5. An apparatus as claimed in claim 4, wherein each look-up table identifies whether a trace message comprises fixed-size portions and/or dynamic-size portions and, for dynamic-size portions, identifies at least one or more context parameters.

6. An apparatus as claimed in claim 1, wherein the at least one memory and the computer program code are configured to, with the at least one processor, cause the apparatus to use current context parameters to determine dynamic-size portions of a trace message generated by the instruction and then determine a size of the trace message generated by the instruction.

7. An apparatus as claimed in claim 6, wherein updating the context comprises updating the context parameters to current context parameters.

8. An apparatus as claimed in claim 1, wherein performing static code analysis of the plurality of instructions comprises, for each instruction: determining whether a flow control is performed by the instruction and selecting what flow control is performed by the instruction to determine a next instruction used by the static code analysis.

9. An apparatus as claimed in claim 8, wherein the flow control is selected based on user input or wherein the flow control is selected automatically and the selection is recorded.

10. An apparatus as claimed in claim 1, wherein performing static code analysis of the plurality of instructions comprises, for each instruction: determining whether an iterative loop is initiated by the instruction and selecting the number of iterations of the iterative loop to determine a next instruction used by the static code analysis.

11. An apparatus as claimed in claim 10, wherein the number of iterations is selected based on user input or wherein the number of iterations is selected automatically and the selection is recorded.

12. An apparatus as claimed in claim 1, wherein the at least one memory and the computer program code are configured to, with the at least one processor, cause the apparatus at least to perform recording numbers of different trace messages generated.

13. An apparatus as claimed in claim 1, wherein the at least one memory and the computer program code are configured to, with the at least one processor, cause the apparatus at least to enable user control of a first instruction and a last instruction for the static code analysis.

14. An apparatus as claimed in claim 1, wherein the at least one memory and the computer program code are configured to, with the at least one processor, cause the apparatus at least to provide a graphical user interface that represents the plurality of instructions as interconnected code blocks and enables user control of one or more of: where static code analysis starts; where static code analysis ends; what flow control occurs; how many iterations occurs in an iterative loop; and the trace message type.

15. A method of estimating a size of memory required to store trace messages generated by instructions, comprising
performing static code analysis of the instructions comprising, for each instruction:
determining whether a trace message is generated by the instruction;
determining whether a size of the trace message generated by the instructions is context dependent;
determining a size of the trace message generated by the instruction;
updating context; and
determining a cumulative size of the trace messages generated by the instructions.

16. A method as claimed in claim 15, comprising: using a look-up table dependent upon trace message type to determine dependence of trace message size on context parameters; determining current context parameter values; and determining a size of the trace message generated by the instruction using the look-up table and the current context parameters.

17. A method as claimed in claim 15, wherein performing static code analysis of the instructions comprises, for each instruction relating to flow control, selecting what flow control is performed by the instruction to determine the next instruction performed in the static code analysis.

18. A method as claimed in claim 15, wherein performing static code analysis of the instructions comprises, for each instruction initiating an iterative loop, determining a number of iterations of the iterative loop based on user input.

19. A tangible non-transitory, computer readable storage medium stored with data readable by a programmable apparatus, the data representing a computer program comprising;
instructions for performing static code analysis of a plurality of instructions comprising, for each instruction:
instructions for determining whether a trace message is generated by the instruction;
instructions for determining whether a size of the trace message generated by the instruction is context dependent;
instructions for determining a size of the trace message generated by the instruction;
instructions for updating context; and
instructions determining a cumulative size of the trace messages generated by the plurality of instructions.

20. An apparatus comprising:
a processor configured to enable a user interface module configured to provide a graphical user interface that represents a plurality of instructions as code blocks and enables user control of one or more of:
where a static code analysis starts;
where the static code analysis ends;
what flow control occurs during static code analysis;
how many iterations occurs in an iterative loop during static code analysis; and
trace message type; and
a static code analysis module configured:
to perform static code analysis of the plurality of instructions comprising, for each instruction:
determining a size of a trace message generated by the instruction based on a context and updating the context; and
to determine a cumulative size of trace messages generated by the plurality of instructions; and
a memory for storing the cumulative size of the trace messages.

* * * * *